(12) United States Patent
Virk et al.

(10) Patent No.: US 10,088,655 B2
(45) Date of Patent: Oct. 2, 2018

(54) PREVIEW STATION AND METHOD FOR TAKING PREVIEW IMAGES OF MICROSCOPE SLIDES

(71) Applicant: Huron Technologies International Inc., Waterloo (CA)

(72) Inventors: Audil Virk, Breslau (CA); Savvas Damaskinos, Kitchener (CA); Reda Fayek, Guelph (CA); Ian Craig, Kitchener (CA)

(*) Notice: Subject to any disclaimer, the term of this patent is extended or adjusted under 35 U.S.C. 154(b) by 0 days.

(21) Appl. No.: 14/901,469

(22) PCT Filed: Jun. 26, 2014

(86) PCT No.: PCT/CA2014/000542
§ 371 (c)(1),
(2) Date: Dec. 28, 2015

(87) PCT Pub. No.: WO2014/205557
PCT Pub. Date: Dec. 31, 2014

(65) Prior Publication Data
US 2016/0139387 A1    May 19, 2016

Related U.S. Application Data

(60) Provisional application No. 61/839,500, filed on Jun. 26, 2013.

(51) Int. Cl.
*G06F 3/12* (2006.01)
*G02B 21/00* (2006.01)
*G02B 21/34* (2006.01)
*G02B 21/36* (2006.01)
*H04N 5/225* (2006.01)
*G06K 15/00* (2006.01)

(52) U.S. Cl.
CPC ........... *G02B 21/002* (2013.01); *G02B 21/34* (2013.01); *G02B 21/365* (2013.01); *H04N 5/2256* (2013.01)

(58) Field of Classification Search
None
See application file for complete search history.

(56) References Cited

U.S. PATENT DOCUMENTS

| 7,133,543 | B2* | 11/2006 | Verwoerd | G06T 7/0042 382/128 |
| 2003/0193567 | A1* | 10/2003 | Hubei | H04N 9/045 348/207.1 |
| 2007/0140543 | A1* | 6/2007 | D'Errico | G01N 15/1475 382/133 |

* cited by examiner

*Primary Examiner* — Dov Popovici
(74) *Attorney, Agent, or Firm* — Daryl W. Schnurr

(57) ABSTRACT

A preview station for previewing microscope slides where each slide has one or more specimens thereon, the preview station having a tray holder supporting a slide tray with a plurality of slides thereon. A digital camera and lens is located on an optical axis relative to the slide tray and a light source illuminates the slide tray. The camera is activated to image each slide in the slide tray and has a memory to store and transmit data from each slide. The preview station can be used in combination with a scanning system and can be made part of a scanning system.

20 Claims, 12 Drawing Sheets

PREVIEW STATION AND METHOD FOR TAKING PREVIEW IMAGES OF MICROSCOPE SLIDES

FIELD OF THE INVENTION

This invention disclosure relates to the field of high-resolution imaging of specimens on microscope slides, with particular emphasis on instrumentation and methods for automated scanning of slides on a microscope-slide scanner. In addition, this disclosure will be useful in the field of high-resolution imaging of microwell plates, well plates, and microarrays. It is applicable in a scanner where a low resolution image of a sample is acquired to be used as a basis for acquiring a higher resolution image of the specimen.

BACKGROUND OF THE INVENTION

The scan speed of microscope slide scanners in pathology has been increased to the point where the setup time required for configuring the scanner to acquire a scan is a significant portion of the total time, and especially when a large number (hundreds or even thousands) of slides must be scanned each day.

After one or more slides are prepared, they are visually examined by the technician and then loaded into a sample holder. The sample holder is then loaded into the slide scanner, or into the autoloader. Before high-resolution scanning, a preview image is recorded for all slides, usually using a camera in the scanner that is dedicated to this operation. The preview image may include only a single slide, or all of the slides in the tray. This preview image may contain an image of each slide's barcode as well as the area containing the specimen (usually tissue). The area containing the specimen is outlined to delimit the area that will be scanned. This can happen automatically or by the operator adjusting the size of the outline on the computer screen until it is near the edges of the sample. When the sample area is chosen automatically, before scanning the operator may check the image of each slide to ensure that the entire area of interest is included in the area to be scanned. Some scanners require focus points to be placed on the sample image before scanning, and that is done manually or automatically (and checked and possibly re-positioned by the operator) at this time. These focus points (or focus dots) are the positions on the sample where focus of the scanner will be measured for automatic adjustment of focus during scanning. In addition, a sub-area inside the region to be scanned with characteristics required for setting white balance (brightfield imaging) in the final scanned image may be chosen at this time. All other settings required to acquire the high-resolution scan are configured at this time with the help of the preview image.

For automated scanning, microscope slides are loaded automatically into a slide scanner. Two general types of microscope slide loaders are common. Slide loaders designed for loading slides onto standard microscopes (for example the Prior Scientific PL-100) and some slide loaders integrated into pathology scanners (for example Aperio ScanScope AT) place microscope slides onto the microscope stage or insert them into the optical path. A second type of slide loader handles sample holders (trays) containing one or more slides, with the advantage that the slides themselves are not handled during movement of the trays, and multiple slides can be loaded into a single tray. The size of slides that can be handled is limited only by the size of the tray and slide sizes can be mixed in a single run or even in a single tray.

When only a single slide, or slides in a single slide holder are to be imaged, the time required for acquiring preview images and subsequently setting up the high-resolution scan is only a few minutes, however when hundreds of slides must be scanned, this pre-scan preparation time becomes significantly larger, and since the scanning system is used for this pre-scan preparation procedure, this limits the number of slides that can be scanned per day.

One example of a commonly-used workflow is described in FIG. 1. The sequence of operations performed in the scanner before scanning commences is as follows:
1. Insert separate slides (or sample holders) 101 into the scanner 100 or into the scanner's autoloader.
2. Using the scanner, acquire preview images of each slide 102. A single image showing all of the slides in the sample holder or separate images of each slide may be used.
3. Using the preview image (or part of the preview image) of each slide in the sample holder, perform automated or manual scan setup 103 for the high-resolution scan. This automated or manual scan setup includes some or all of the following steps for each separate slide, or for each slide in the sample holder:
   Find the area of the slide containing tissue to be scanned.
   Place focus dots on the sample image inside the area to be scanned.
   Choose a location for setting white balance in the final scanned image.
   Choose locations for measuring sample tilt inside the area to be scanned.
   Read barcode on each slide and on the sample holder to record data required to set imaging parameters (e.g. which stain is on the tissue, whether the slide should be read in brightfield or fluorescence, etc.).
1. Review some or all of the items in Step 3 above (optional). The scanner now knows where all of the microscope slides are in its slide store, and scan priority for a particular slide can be changed by the operator at this time.
2. Start Scanning 104 to image the Region of Interest (ROI) identified in the preview image. Note that the scanner itself has been used during steps 2-4 and has been unavailable for scanning during this time.

The drawbacks of this commonly-used workflow include, but are not limited to:
1. Slide scanning is a sequential process of acquiring preview images, creating scan setups, and scanning high-resolution images.
2. The Scanner cannot acquire high-resolution images while preview images are being captured by the scanning system.
3. The Scanner cannot acquire high-resolution images while scan-setup is taking place.
4. Preview images cannot be taken while scan-setup information is being generated.
5. Preview images cannot be acquired while high resolution images are being captured.
6. Scan-setup cannot take place while preview images are being captured.
7. Scan-setup cannot take place while high resolution images are being captured.
8. The scanner may not be able to acquire high resolution images while barcode and label are being captured.
9. Samples loaded into the scanner (or the scanner's autoloader) while the scanner is in operation are not identified until after the scanner completes reading each sample's barcode during the preview scan process, so scanning of critical samples must wait until the scanner collects a preview image of that sample and interrupts the scanning process to scan that important sample.

Definitions:

For the purposes of this disclosure "Low Resolution" may be defined as spatial resolution greater than 0.5 micron.

For the purposes of this disclosure "High Resolution:" may be defined as spatial resolution less than or equal to 0.5 micron.

For the purposes of this disclosure, "Preview Image" may be defined as a low resolution overview image of a partial, whole or many specimen(s) used to setup the required parameters for performing a high-resolution scan. It can also include an image of labels, bar codes, and other identifiers of the slide, sample holder, and specimen.

For the purposes of this disclosure "Sample" may be defined as anything presented to the instrument for the purpose of being imaged, generally a specimen on a microscope slide, the entire microscope slide containing the specimen, a microwell plate, a semiconductor wafer, etc, that can be inserted into the scanner/autoloader for imaging.

For the purposes of this disclosure "Sample Holder" may be defined as any device that can be used to hold one or more samples, and can be inserted into the scanner/autoloader for imaging.

For the purposes of this disclosure "Autoloader" may defined as a device that loads samples or sample holders into the scanner.

For the purposes of this disclosure "Workstation" may be defined as a computer to control the scanner and/or autoloader and can generate scan-control information from preview images (scan-setup).

For the purposes of the disclosure "Scan-Setup" may be defined as a process that uses a preview image to generate all of the information required by the scanner for scanning a high-resolution image of a specified area. This information can include but is not limited to information defining the region of interest, focus positions, flat fielding, colour content, specimen type identification, corresponding scanning protocol, etc.

For the purposes of this disclosure "Preview Imager" may be defined as a device dedicated to capturing preview images. In some cases the Preview Imager will also have the capability to generate scan-setup information from the preview images. A preview imager can be an independent device or a part of a larger system, for example, part of the scanner and/or autoloader.

For the purposes of this disclosure "ROI" (region of interest) may be defined as the area of the specimen that will be imaged at high resolution.

For the purposes of this disclosure "Tablet" may be defined as a general-purpose computer contained in a single panel. Its distinguishing characteristic is the use of a touch screen as one of several input devices.

SUMMARY OF THE INVENTION

It is an aspect of this disclosure to provide an apparatus and method for previewing samples/sample-holders before scan-setup and scanning are performed, where this apparatus is an appliance that can be remote from the scanner.

It is an aspect of this disclosure to provide an apparatus and method for previewing samples/sample-holders before scan-setup and scanning are performed, where this apparatus is an appliance that can be a part of the scanner.

It is an aspect of this disclosure to provide an apparatus and method for previewing samples/sample-holders before scan-setup and scanning are performed, where this apparatus is decoupled from the operation of the scanner, allowing preview operations to be performed while the scanner is in operation scanning other samples.

It is an aspect of this disclosure to provide an apparatus and method for previewing samples/sample-holders before scan-setup and scanning are performed, where this apparatus is decoupled from the scan-setup process, allowing preview operations to be performed while scan-setup data is generated from previously-acquired preview images.

It is an aspect of this disclosure to provide an apparatus and method for scan-setup where this apparatus is decoupled from preview imaging, allowing scan-setup operations to be performed while preview imaging is performed.

It is an aspect of this disclosure to provide an apparatus and method for scan-setup where this apparatus is decoupled from the operation of the scanner, allowing scan-setups to be performed while the scanner is in operation scanning other samples.

It is an aspect of this disclosure to provide an apparatus and method for previewing samples/sample-holders before scan-setup and scanning where both the apparatus and the scanner include identifiers to enable accurate alignment and positioning of the sample/sample holder when it is transferred from the apparatus to the scanner.

It is an aspect of this disclosure to provide an apparatus and method for previewing samples/sample-holders before scan-setup and scanning, where the apparatus is separate from the scanner and captures information about the samples to be scanned that includes some of, but not limited to, the following information: an image of each sample that also shows the sample's barcode and/or label, (or information contained in the slide's barcode attached or embedded), information that delimits the sample area for scanning, the position of focus points on the sample, the position(s) for setting the scanner's white-balance. If an image of the slide-holder's barcode is not transmitted to the scanner, the information encoded in that barcode or other information to identify the slide holder can be transmitted instead.

It is an aspect of this disclosure to provide an apparatus and method for previewing samples/sample-holders before scanning, where this apparatus is an appliance that allows the user to load samples into a sample holder while the sample holder is within the apparatus.

It is an aspect of this disclosure to provide an apparatus and method for previewing samples/sample-holders before scanning, where this apparatus is an appliance that allows for the generation of an unlimited number of preview images and scan-setups in advance of scanning.

It is an aspect of this disclosure to provide an apparatus and method for previewing samples/sample-holders before scanning, where this apparatus is an appliance that allows for the generation of an unlimited number of preview images and scan-setups in advance of scanning that can feed multiple workstations/scanners.

It is an aspect of this disclosure to provide an apparatus and method for previewing samples/sample-holders before scanning, where this apparatus is an appliance that allows for multiple instances of the appliance distributed over an area that can feed one or multiple workstations/scanners.

It is an aspect of this disclosure to provide an apparatus and method for previewing samples/sample-holders before scanning, where the apparatus contains light sources and detection capability for previewing samples in a variety of imaging modes, including brightfield and/or fluorescence.

It is an aspect of this disclosure to provide an apparatus and method for previewing samples/sample-holders before scanning, where this apparatus can be used for assessing sample quality and suitability for scanning.

It is an aspect of this disclosure to provide an apparatus and method for previewing samples/sample-holders before scanning, where this apparatus is an appliance that can be remote from the scanner, and where such appliance contains a viewing screen and apparatus for interacting with the preview image.

It is an aspect of this disclosure to provide an apparatus and method for previewing samples/sample-holders before scanning, where this apparatus is an appliance that can be remote from the scanner, and where in this case the appliance does not include a built-in viewing apparatus, but includes wireless or wired capability to communicate with a separate viewing apparatus.

It is an aspect of this disclosure to provide an apparatus and method for previewing samples/sample-holders before scanning, where this apparatus is an appliance that can be remote from the scanner, and where such appliance may image a single sample or multiple samples on a sample-holder.

It is an aspect of this disclosure to provide an apparatus and method for previewing and reviewing the preview images of samples/sample-holders before scanning, where this apparatus contains sufficient digital memory to store images of slides and/or sample holders containing slides to enable all of the slides in a batch to be reviewed at the same time, after images of all sample holders (or slides) in the batch have been acquired.

It is an aspect of this disclosure to provide an apparatus and method for previewing samples/sample-holders before scanning, where the apparatus is separate from the scanner and communicates data from images of the slides to be scanned to the scanner after pre-scan preview is completed, where both the area of the specimen to be scanned and the barcode information on each slide are contained in the data transmitted.

It is an aspect of this disclosure to provide an apparatus and method for previewing samples/sample-holders before scanning, where the apparatus is separate from the scanner and communicates an image of the sample holder containing slides to be scanned that includes an image of a barcode on the sample holder that identifies the sample holder as well as an image of a barcode on each microscope slide. Most commonly, all of this information is contained in a single image.

It is an aspect of this disclosure to provide an apparatus and method for previewing samples/sample-holders before scanning, which includes or connects to a local viewing station (for example a local laptop computer or Tablet, for example an iPad) where this apparatus is separate from the scanner and the local viewing station communicates information about the slides to be scanned to the scanner, using wireless or wired connection, during or after pre-scan preview. Pre-scan preview can be accomplished either on the remote viewing station or on the scanner's viewing station.

It is an aspect of this disclosure to provide an apparatus and method for previewing samples/sample-holders before scanning, where the preview-imager camera connects to a local viewing station or to the scanner wirelessly using a wireless memory card (like the WiFi SD card).

It is an aspect of this disclosure to provide an apparatus and method for previewing samples/sample-holders before scanning where the local viewing station is one of a desktop computer, a laptop computer, a tablet computer (like an iPad), a portable media player that includes a viewing screen that allows the operator to view and interact with an image on the screen, a smart phone, or other wireless or wired device that allows the operator to view and interact with an image of the microscope slide or slides.

It is an aspect of this disclosure to provide an apparatus and method for previewing samples/sample-holders before scanning where an image of the sample holder or single sample (single slide) is acquired automatically upon insertion of the sample holder or single sample into the apparatus, and this image is stored in digital memory. A series of samples or sample holders can be inserted into the apparatus, causing a series of images to be stored for later use.

DESCRIPTION OF THE INVENTION

The present invention is an apparatus ("preview station") and method for previewing microscope slides before scanning, where previewing can be accomplished using an apparatus that is remote from the scanner, and preview data can be transmitted to the scanner after preview is complete; or where the preview apparatus is attached to or included in the scanner, but uses a different optical path and illumination from that used in scanning, and can be operated while the scanner is scanning slides.

Figure 1:
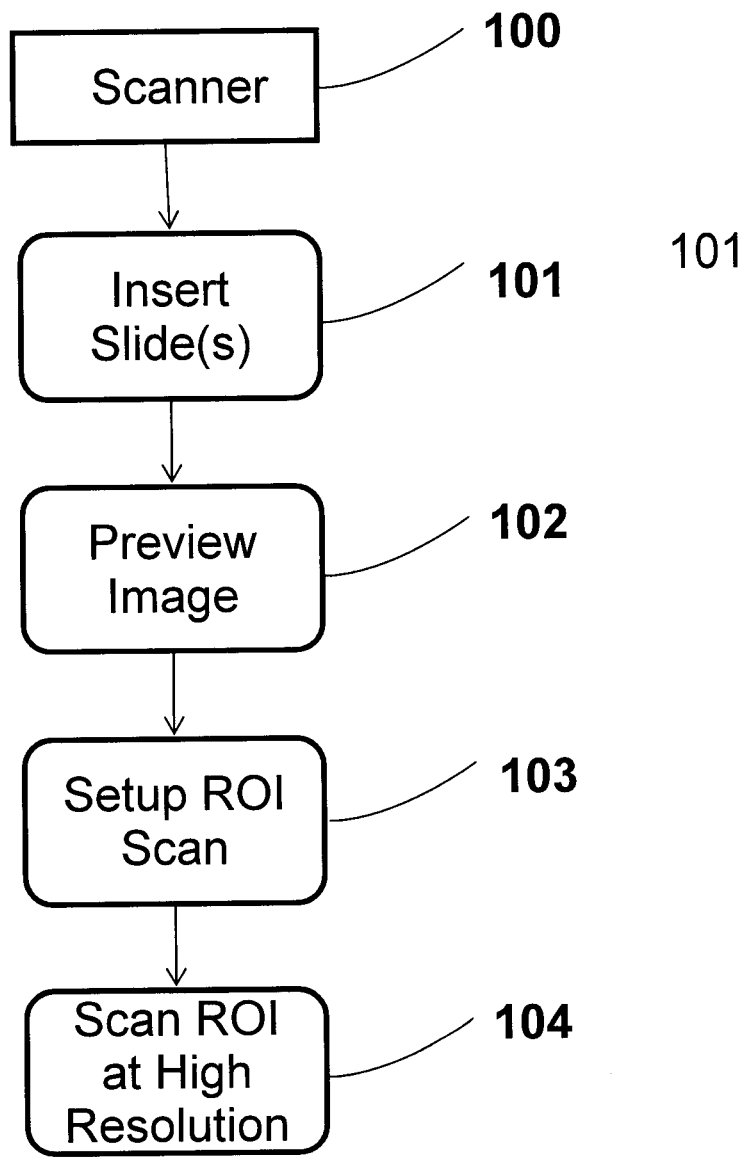
FIG. 1 shows a schematic representation of a common prior-art workflow used to image samples with a scanning system.
Figure 2:
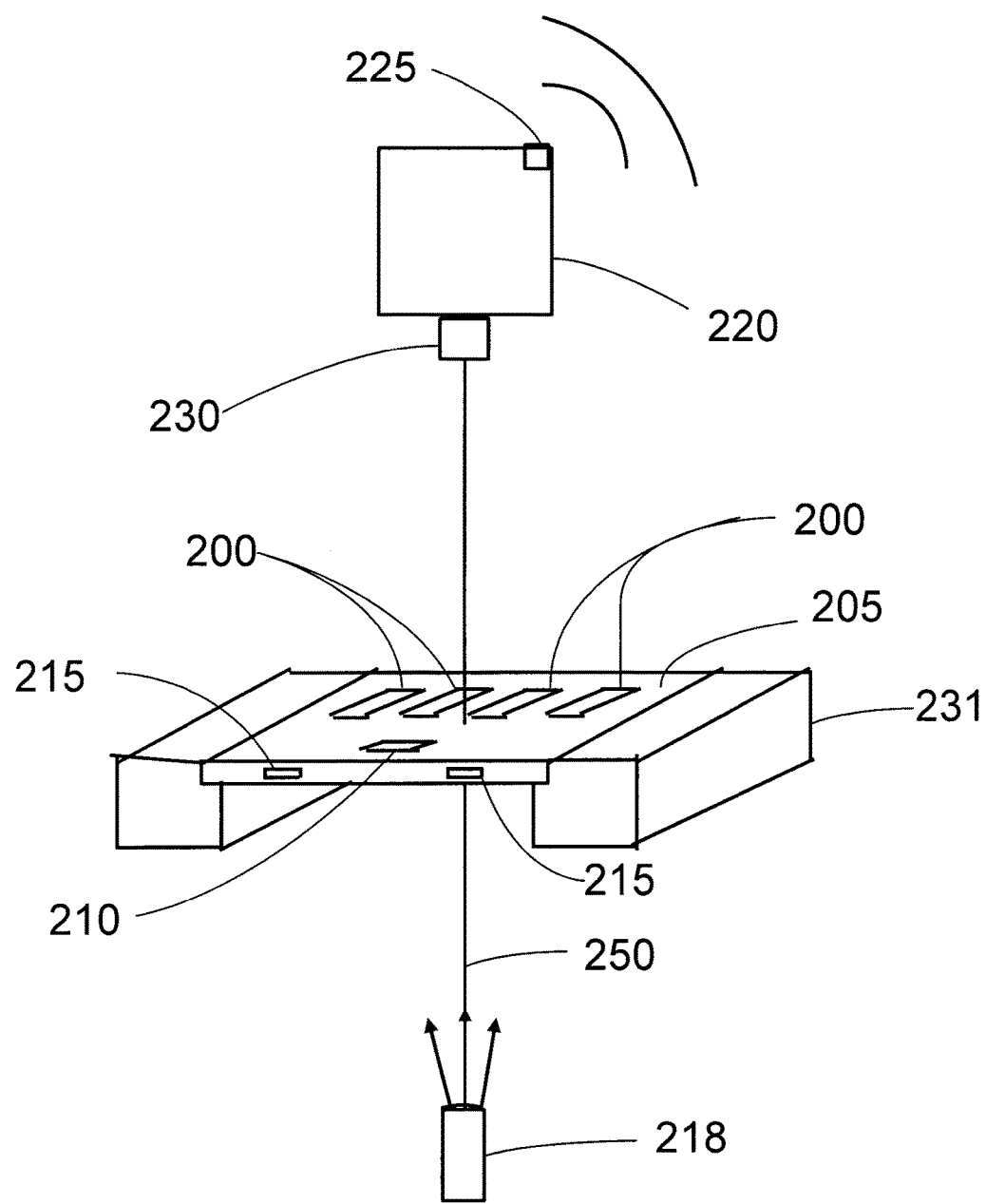
FIG. 2 shows a schematic representation of the optical components of a Preview Station with white light source for transmission illumination of slides in the slide tray.

FIG. 2 shows a schematic representation of a first arrangement of optical components of a Preview Station. Microscope slides 200 are held in a slide tray (or slide carrier) 205 (the slide tray is open beneath the slides) and are illuminated from below by transmission illumination source 218. The slide tray is held on both sides by a tray-holder 231. (Tray-holder 231 is designed such that when the slide tray is inserted later in the scanner, both the position and alignment of the slide tray is the same in the scanner as it was in the preview station.) The slide tray is inserted into the tray holder by sliding it into place using handles 215. The slide tray is identified by tray barcode 210 which may be illuminated from below by transmission illumination source 218 (the slide tray is open beneath the barcode when illumination from below is used) or from above using a second light source (not shown). Light from transmission illumination source 218 illuminates the entire bottom of the slide tray, including all of the microscope slides. A digital camera 220 is placed above the slide tray on an optical axis 250 with its lens 230 focused to image the slides in the slide tray. In this embodiment, digital camera 220 includes a wireless memory card 225 (like the WiFi SD card) or other communication means to transmit the image of the slide tray (including slides and barcodes) to an external viewing station (containing viewing, computing, storage and communication capabilities). Images from a batch of slide trays can be stored in the SD card and transmitted to the external viewing station on demand.

For use with single slides that are not in a slide tray or other slide carrier, slide tray-holder 231 can be redesigned to hold only a single slide, or a single-slide carrier can be inserted into slide-tray holder 231.

Figure 3:
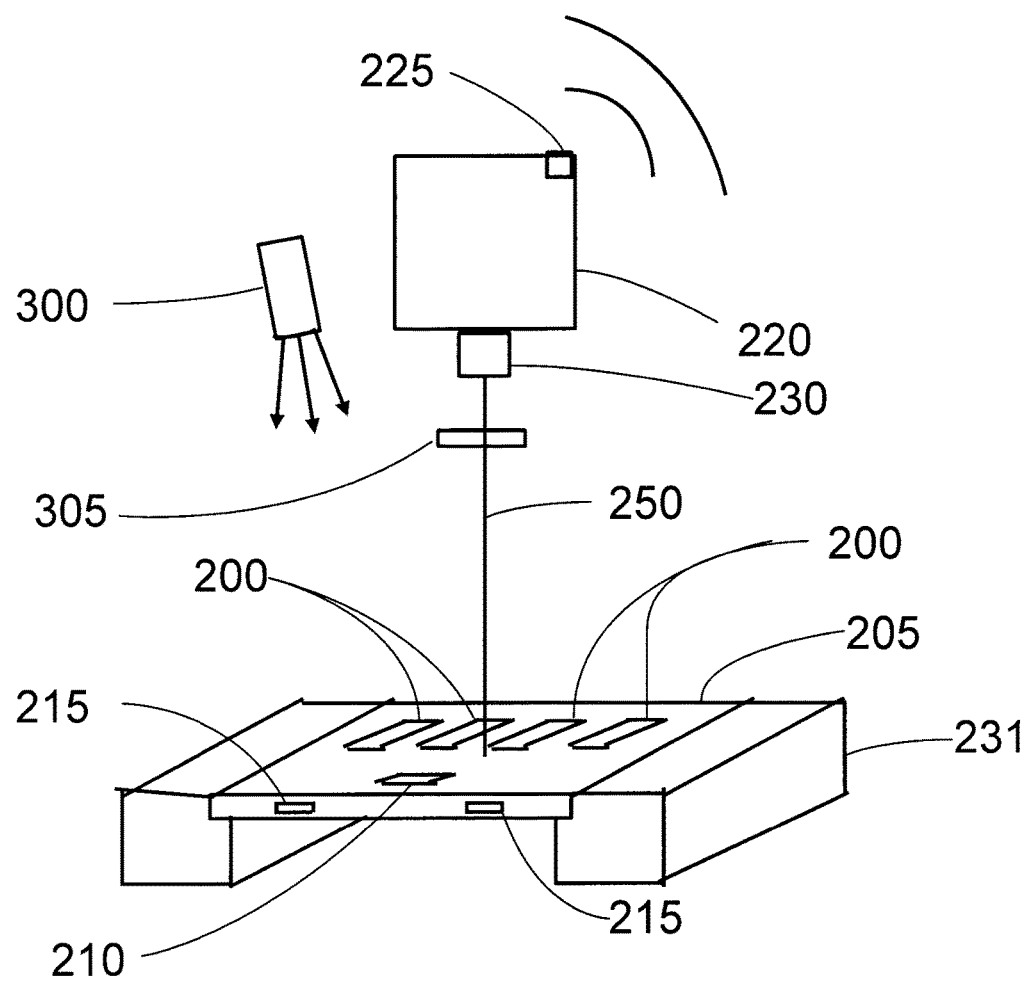
FIG. 3 shows a schematic representation of the optical components of a Preview Station with epifluorescence illumination.

FIG. 3 shows a schematic representation of a second arrangement of optical components of a Preview Station. In this arrangement, transmission light source 218 has been replaced by an epi light source (epi illuminator) 300 mounted to illuminate the slide tray and microscope slides from above. This arrangement also illuminates the barcodes on microscope slides and on the slide tray from above and in some situations will result in better images of the barcodes and data written on the microscope slides, which may be written on labels that are easier to image when illuminated from above. In addition, this arrangement is particularly useful for fluorescence imaging, where the illumination wavelength band of epi light source 300 is adjusted to match the excitation wavelength band of the fluorophores in use, and an emission filter 305 is inserted into the optical path in front of lens 230 to pass the fluorescence emission wavelengths from the specimen. In this case, when fluorescence imaging is required, it may be appropriate to replace colour camera 220 with a monochrome camera.

Figure 4:
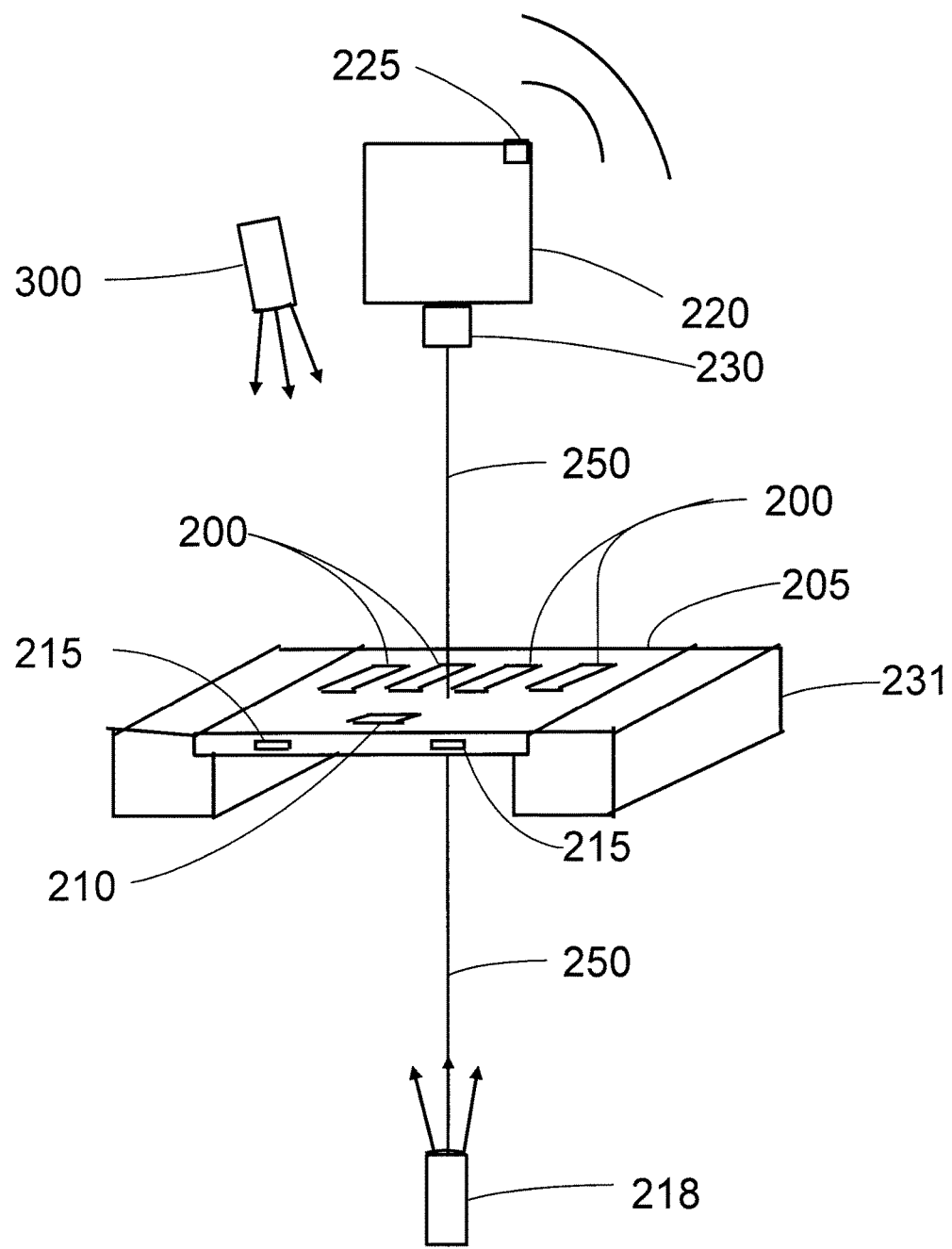
FIG. 4 shows a schematic representation of the optical components of a Preview Station with both brightfield transmission and epifluorescence illumination sources.

FIG. 4 shows a schematic representation of a third arrangement of optical components of a Preview Station, in which both transmission and epi illumination are available, either separately or in combination. Note that emission filter 305 has been removed from the optical path, but can be replaced for fluorescence imaging using epi illuminator 300. This optical combination is particularly useful when an image using transmission illumination is best for tissue finding, and an image using epi illumination is best for fluorescence and for reading the tray barcode 210 and/or the barcodes and written information (sometimes on stickers) on microscope slides 200. One technique to produce a single image with good contrast for both the barcodes and tissue specimens is to acquire one image using transmission illuminator 218, and a second image using epi illuminator 300, then combine the two images digitally. There are many ways to combine the two images. One possibility is to simply digitally add the two images together on a pixel-by-pixel basis, since they are perfectly registered, and the areas of the microscope slides containing tissue will be much brighter in the transmission-illuminated image, while the areas containing barcodes and stickers will be brighter in the epi-illuminated image. Another possibility is to mask the epi-illuminated image to include only areas containing barcodes and written information, mask the transmission-illuminated image to include all other areas, then digitally add the two images together to produce a single image.

Figure 5:
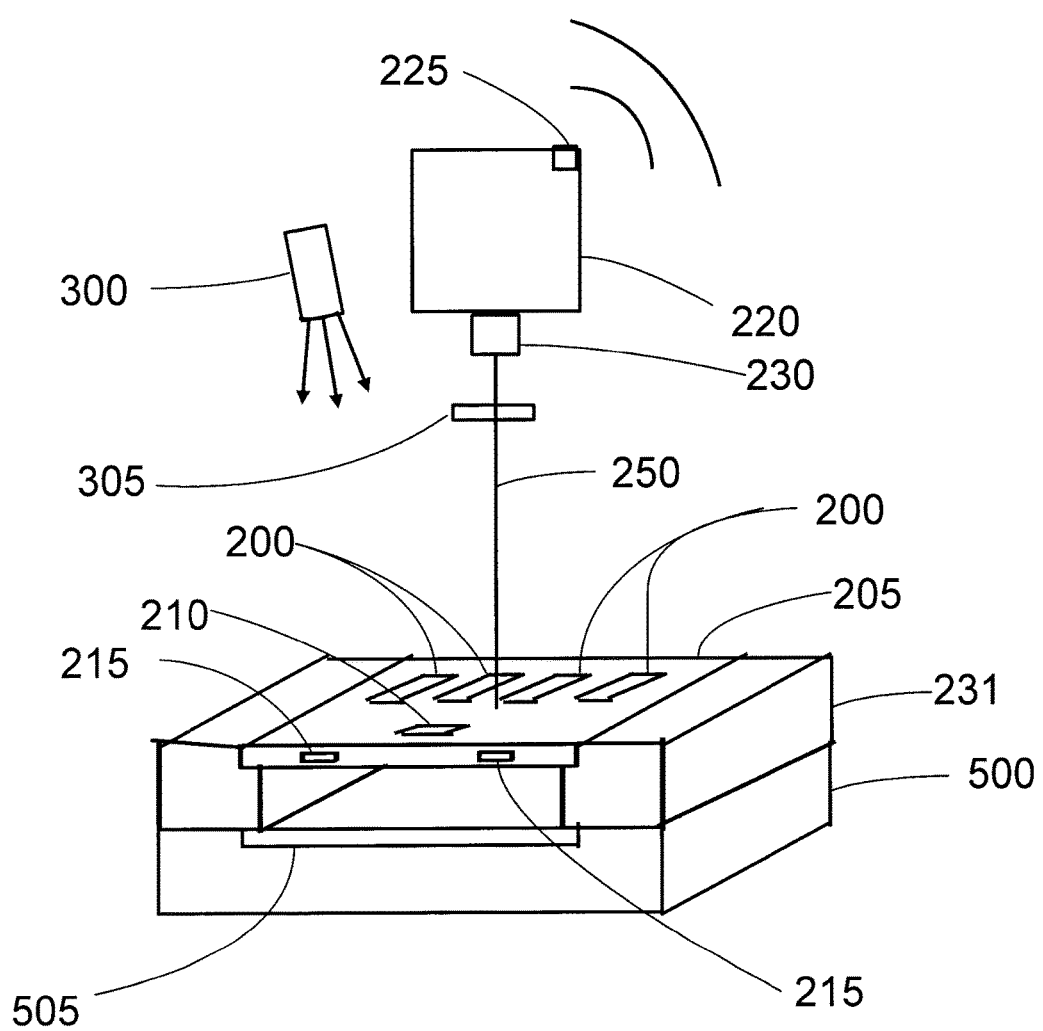
FIG. 5 shows a schematic representation of the optical components of a Preview Station with both brightfield transmission and epifluorescence illumination sources, in which a transilluminator is used for transmission illumination.

FIG. 5 shows a schematic representation of a fourth arrangement of optical components of a Preview Station. This arrangement is functionally the same as that shown in FIG. 4, however transmission illumination source 218 has been replaced by transilluminator 500. Transilluminators (sometimes called light boxes) are often used when imaging gels in the laboratory, and are available as white light and/or UV illuminators, using either LED or incandescent sources, or fluorescent tubes placed below flat plate 505. Plate 505 may be constructed of transparent, translucent, fluorescent, or filter material. Plates can be removed and replaced to change the spectral characteristics of the transmission illumination, and/or the spectral characteristics can be changed by changing the illumination source (for example, a white light source can be constructed using arrays of red, green and blue LED's, and these three arrays can be activated separately or in combination).

Figure 6:
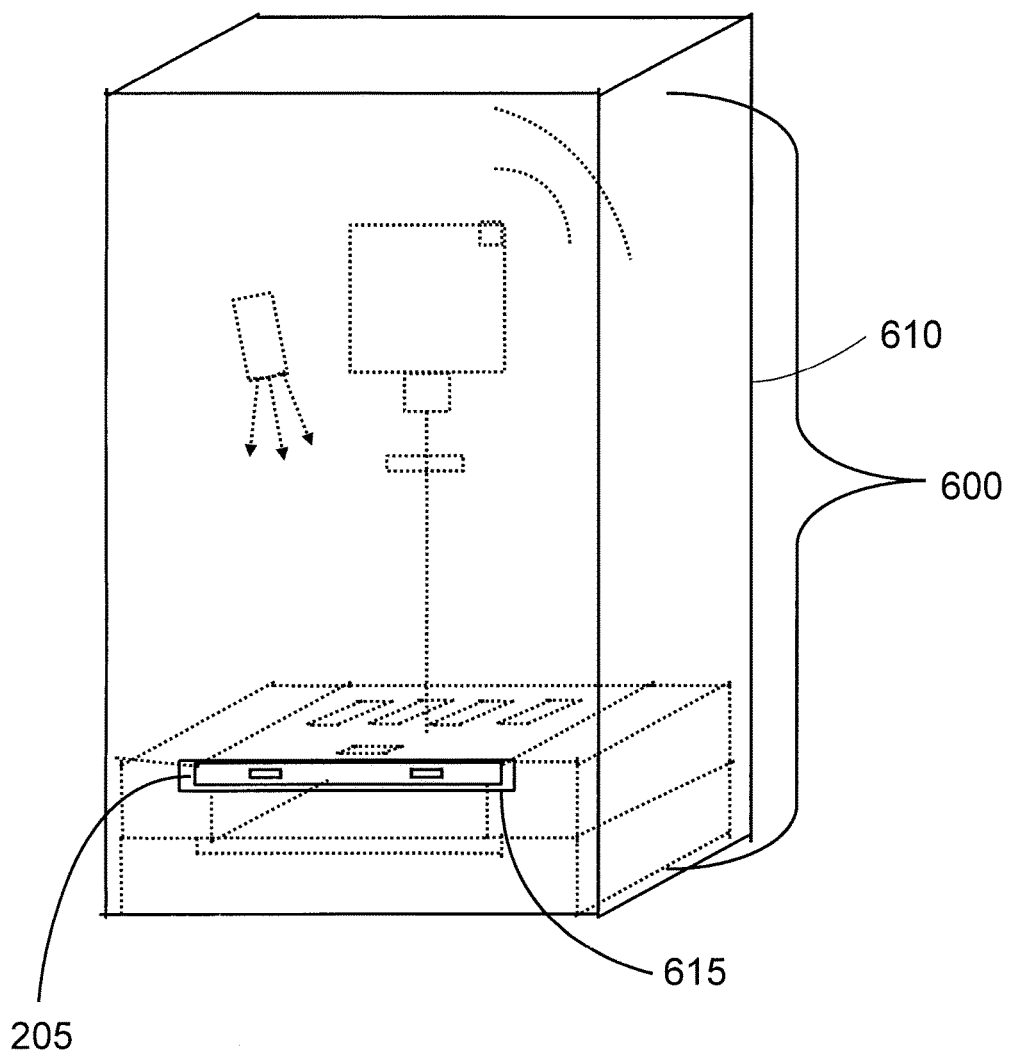
FIG. 6 shows a schematic representation of a Preview Station with the components of FIG. 4 (dotted lines) placed inside a light-tight case.

FIG. 6 shows a schematic representation of a first (preferred) embodiment of a Preview Station using the optical system comprised of the arrangement shown in FIG. 5. In FIG. 6, the preview station optical system 600 shown in this figure using dotted lines is comprised of the same components detailed in FIG. 5. A light-tight enclosure (or "hood") 610 contains a slot 615 for insertion and removal of slide tray 205. In this embodiment, before hood 610 is placed over optical system 600, slides in slide tray 205 can be examined visually using illumination from transilluminator 500 and this provides a quick and easy method of quality control to find obvious flaws in microscope slide preparation even before using the Preview Station camera.

After adjusting epi light source 300 and transilluminator 500 to achieve the correct illumination intensity and colour for the slides to be previewed, and filter 305 is either removed from the optical train or the correct filter is inserted, hood 610 is placed over optical system 600 and slide tray 205 is inserted through slot 615. This embodiment does not have an integrated computer and viewing screen, so the camera can be triggered manually or set to automatically trigger a few seconds after insertion of a new slide tray (sensed using a mechanical switch, not shown in the Figure) or the camera can be triggered remotely using WiFi or a direct connection to a remote or local viewing station. If the preview station camera is triggered automatically by insertion of a slide tray, the images can be stored in memory in the camera, and then transferred in a batch to a local or remote viewing station. Such a local or remote viewing station can be one of a desktop computer, a laptop computer, a tablet computer (like an iPad), a portable media player that includes a viewing screen that allows the operator to view and interact with an image on the screen, a smart phone, or other wireless or wired device that allows the operator to view and interact with an image of the microscope slide or slides, or the scanner's viewing station.

Note: A light-tight enclosure 610 can be added to each of the three optical component arrangements shown in FIGS. 2, 3 and 4 to produce a second, third and fourth embodiment of a Preview Station.

Figure 7:
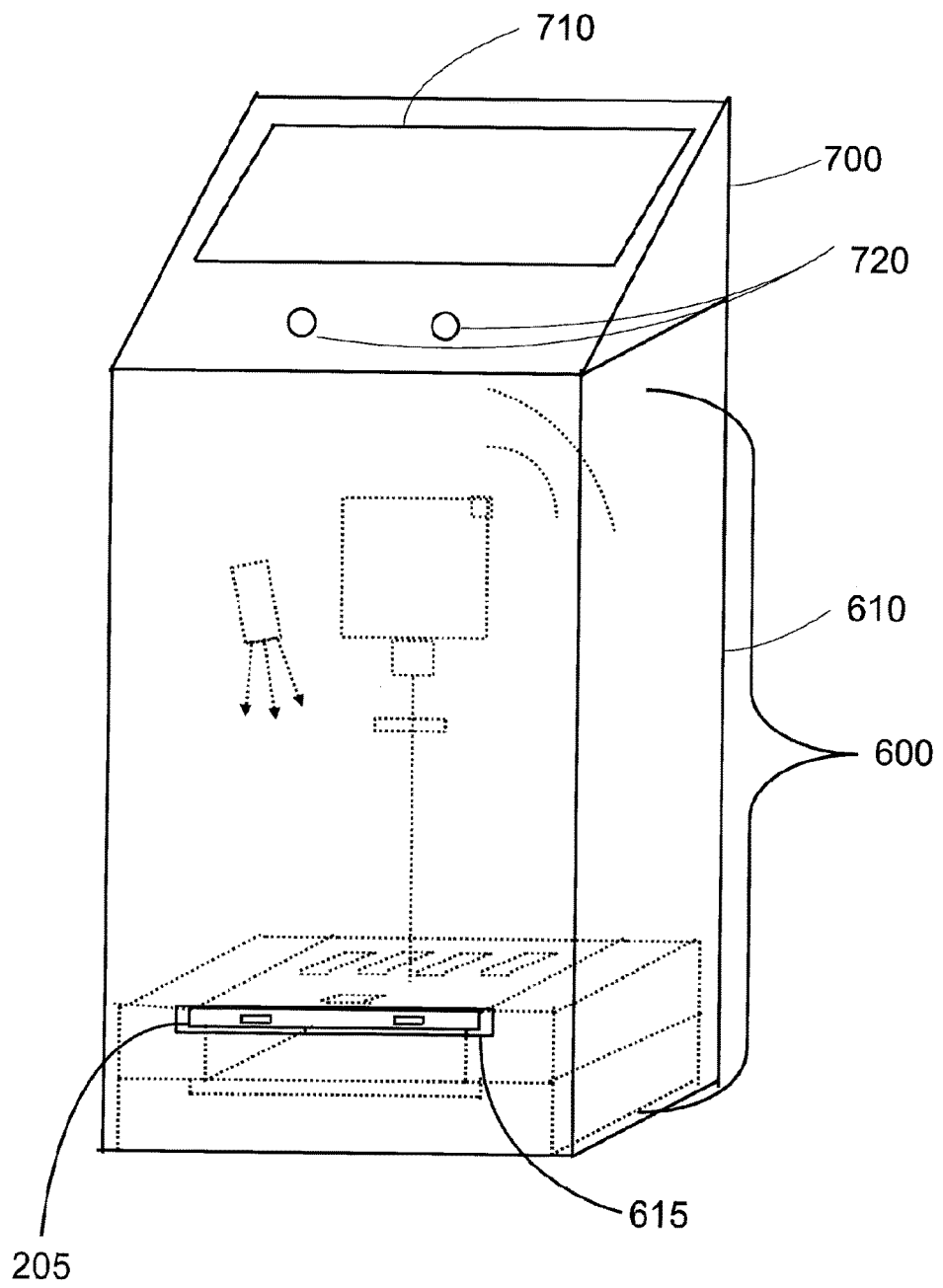
FIG. 7 shows a schematic representation of a stand-alone Preview Station comprised of the optical components of FIG. 4 and including a computer with touch-sensitive viewing screen.

FIG. 7 shows a schematic representation of a fifth (preferred) embodiment of a Preview Station using the optical system comprised of components shown in FIG. 5. In FIG. 7, the preview station optical system 600 shown in this figure using dotted lines is comprised of the same components detailed in FIG. 5. A light-tight enclosure 610 contains a slot 615 for insertion and removal of slide tray 205. In this embodiment, a computerized viewing station 700 is mounted on top of light-tight enclosure 610. A light-tight door (not shown) in the front panel of enclosure 610 provides access to the light sources, camera and filter. The computerized viewing station mounted on top of enclosure 610 is comprised of an integrated computer that communicates with and controls the camera or cameras and light sources, stores images and metadata, and communicates with the scanner. (This figure shows the camera communicating with the computer in viewing station 700 using a WiFi SD Card, however a wired connection between the camera and the viewing station computer can also be used. Communication between the viewing station computer and the scanner can be either wired or wireless.) Viewing screen 710 is a touch screen that enables the operator to view and interact with the computer and an image on the screen. AC power for the unit and control of the light sources may be achieved by using mechanical switches or controls 720, or using the touch screen. This fifth embodiment is a stand-alone preview station with all of the features and components required to allow the user to view and interact with images of the slide tray and individual slides, and to store and later communicate both preview images and data to the scanner.

Note: A light-tight enclosure 610 and computerized viewing station 700 can be added to each of the three optical component arrangements shown in FIGS. 2, 3 and 4 to produce a sixth, seventh and eighth embodiment of a Preview Station that are also stand-alone instruments.

Figure 8:
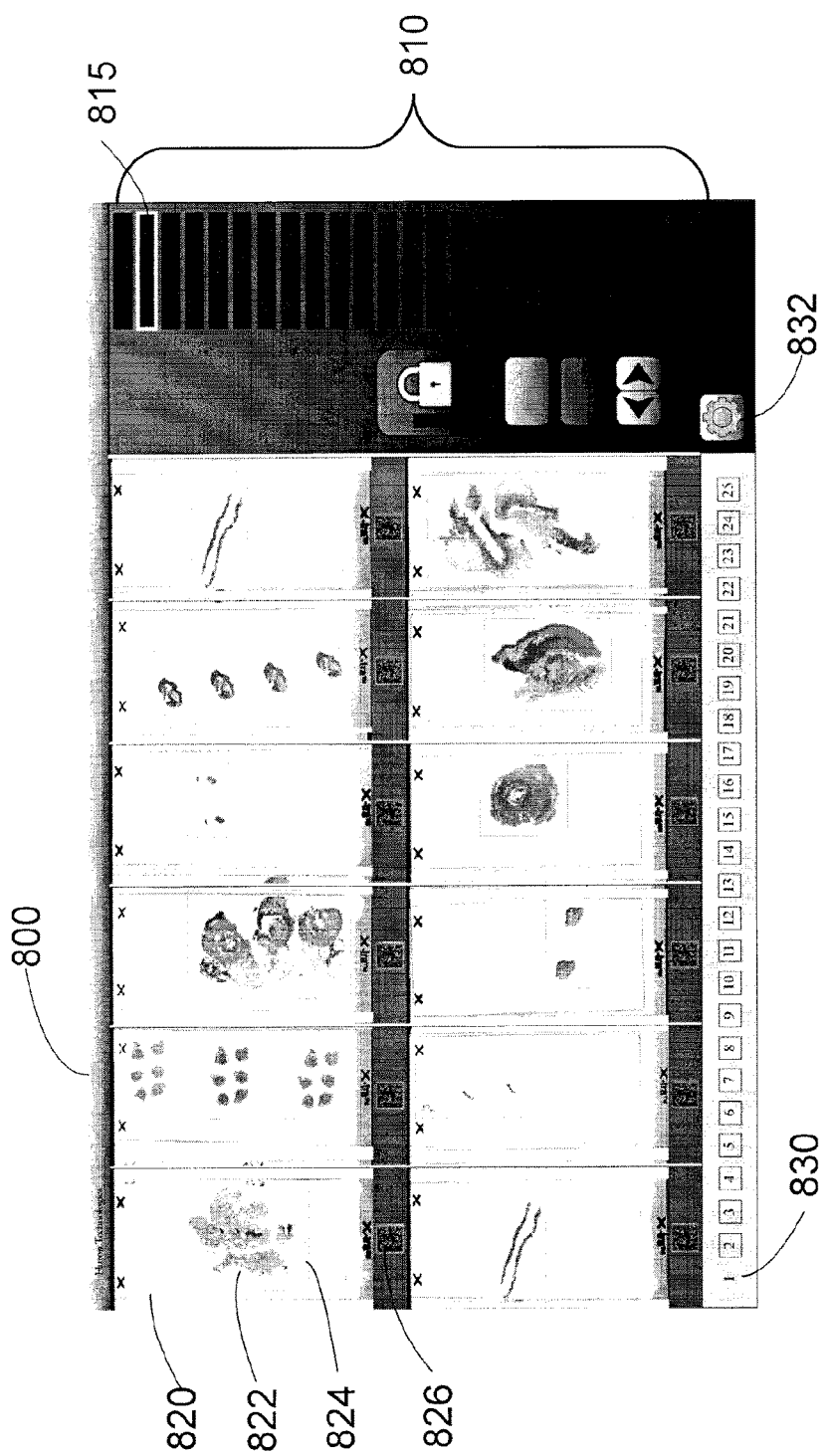
FIG. 8 shows one possible implementation of the view in a computer viewing screen of the image of a slide tray holding 12 slides and the touch-screen controls used during preview before scanning.

FIG. 8 shows one implementation of a viewing screen 800 that can be used on a stand-alone Preview Station or on the viewing screen of a remote or local viewing station. A series 810 of horizontal rectangles 815 represents the slides on the slide tray imaged on the screen. Small squares 830 represent the number of the slide tray being imaged (in this early implementation of a viewing screen the slide tray number was manually changed from 1 to 25 using button 832—in later implementations the slide tray number is read from a barcode and displayed on the screen). Microscope slides 820 include tissue specimens 822 and slide barcodes 826 on each slide. The scan area is adjusted by changing the position of the sides of rectangle 824 that delimits the area to be scanned on the scanner. A zoom function allows the user to zoom in to increase the size of the view of each slide in the tray.

Figure 9:
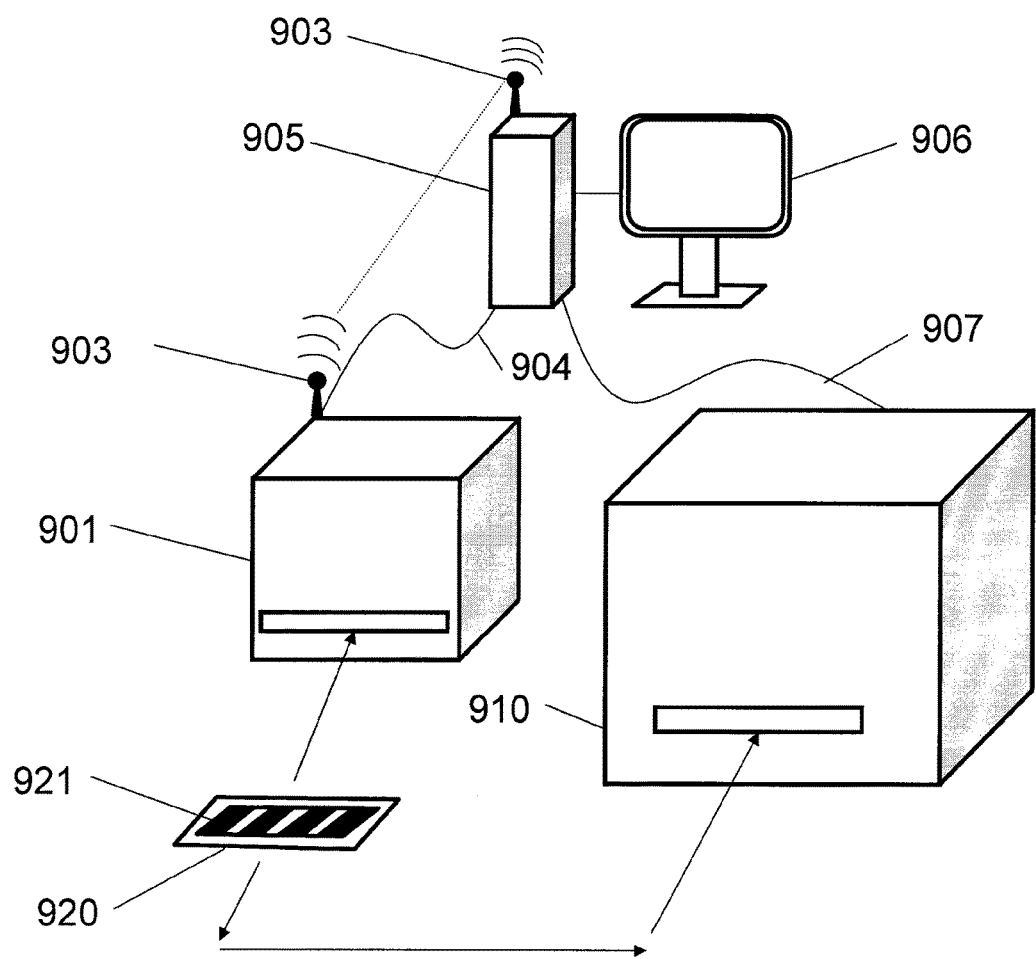
FIG. 9 shows a schematic representation of an instrumentation setup for scanning that includes one or more preview stations connected to a workstation that controls one or more scanners.

FIG. 9 shows one possible arrangement of a Preview Station and scanner. Note that in a large hospital or laboratory, one or more preview stations may be connected to one or more scanners. A Preview Station 901 reports preview image data, scan parameters, quality control (QC) information, and scan priority to a Scan Setup Workstation and Database 905 using wireless transmission 903 or through wired connection 904. (Note: In some implementations, the Preview Station sends only images to the Scan Setup Workstation and scan-setup information is produced in the Scan Setup Workstation.) Scan Setup Workstation and Database 905 is attached to a display 906, which may be separate from or internal to Workstation 905. Workstation 905 interacts with scanner 910 (or multiple scanners) through a Network 907, which may be wired or wireless. When multiple scanners are used, each may be set up for particular kinds of imaging in advance—for example one may be a fluorescence scanner, one may be a brightfield-only scanner, and one may be used only for highest priority scanning. Many combinations are possible. Slide trays are loaded into a scanner or into that scanner's autoloader after previewing in Preview Station 901. Using information stored in Scan Setup Workstation and Database 905, a scanner requests a particular slide tray, the autoloader loads that tray into the scanner, and scan commences. When scanning of the slides in that tray is completed, the Autoloader unloads the tray and places it in a "completed work" storage stack (not shown). Final scanned images and metadata for the slides in each tray are stored in Scan Setup Workstation and Database 905 and can be transmitted on request to a remote medical imaging station (not shown—in the physician's office for example) either wirelessly or by wire.

Many different arrangements of components are possible in a large hospital or laboratory. For example, several different Preview Stations can report data to the same Scan Setup Workstation and Database, and the Scan Setup Workstation and Database can control multiple scanners, each of which has its own autoloader, where each of these scanners (and autoloaders) is connected to the Network 907. Network 907 may be a wired or wireless network.

One example of the steps required for scanning slides using the Preview Station (some of these steps can be omitted, combined or automated in specific installations) are as follows:

1. Insert prepared slides into the slide tray.
2. Insert slide tray into the Preview Station and activate camera.
3. Choose illumination source(s) and adjust intensity and wavelength.
4. Insert or remove filter if required.
5. Acquire a preview image of the slide tray.
6. View all slides for obvious defects using the full screen view as shown in FIG. 7.
7. Read barcode on each slide and on the slide tray to record data required to set imaging parameters (e.g. which stain is on the tissue, whether the slide should be read in brightfield or fluorescence, etc.).
8. Choose one slide (and zoom in if necessary) to manually set scan area or to verify and adjust an automatically-chosen scan area.
9. Verify and adjust if necessary automatically chosen focus spot positions or manually set positions of focus spots (not required for instruments that do not require specific focus spots for automatic focus).
10. Choose position of an area inside the scan area which can be used to set white balance in the image (or confirm a valid area has been chosen automatically) if required.
11. Chose the next slide and repeat steps 8-10 until scan parameters for all of the slides in the slide tray have been checked and revised if necessary.
12. Store preview image and all data required to adjust the scanner and identify each slide and slide tray.
13. Set scan priority for each slide tray. This can be particularly useful when a batch of slides must be scanned as soon as possible, and scan priority can direct the scanner to scan the slides in this batch immediately after loading the tray into the scanner's autoloader, or if the priority is low, to allow the scanner to wait while higher priority slides are scanned.

14. Remove slide tray and insert the next slide tray. Perform steps 3-13 for each tray in the batch.

15. When slide trays are inserted into the scanner, or into the scanner's autoloader, transfer the image and data file for each slide tray from the Preview Station to the scanner where it can be viewed on the scanner's viewing station and/or used to automatically control scanning. The barcode on the slide tray is read automatically upon insertion of the tray into the autoloader (or into the scanner if it has no autoloader) to identify the slide tray and choose the correct image file and data.

Use of the preview station described in this document gives several advantages when scanning a large number of microscope slides:

1. Trays of slides can be checked for quality control and viewed for obvious defects; the scan area can be chosen automatically using tissue-finding algorithms and then reviewed and corrected; focus spot positions (if required) can be automatically chosen and adjusted if necessary, or set manually; an area for white balance calibration can be chosen (if required), and an image of the slide tray and slides plus all of the data required to identify single slides and slide trays and to control the scanner for automated operation can be stored and transmitted to the scanner when each tray is inserted. All of this can be performed using a Preview Station on a laboratory bench, which is often remote from the scanner (and in the laboratory where the slides are prepared), and does not interfere with operation of the scanner.

2. Steps 2 to 13 in the numbered list above have been decoupled from the scanner, enabling the scanner to work continuously scanning slides while scan setup and preview is completed using the remote preview station, making much more efficient use of the scanner, and also allowing the slide preparation technicians to review slides for quality control and set scan parameters immediately without having to wait until the scanner finishes the slides already being scanned.

3. Since only the preview images are required to perform steps 6-13, the operator can acquire preview images of all of the slide trays and then at a later time perform steps 6-13 using each image. This can be particularly useful if the Preview Station has no integrated viewing station, and this set of images can be viewed and acted upon using a remote viewing station (like a laptop computer or tablet).

4. If the scanner is free, and a large number of slides must be scanned, a small number of slide trays can be previewed and reviewed and loaded into the scanner to start scanning. The rest of the slide trays can then be previewed and reviewed while the scanner is already in use.

5. The preview station described in this document improves both technician workflow and scanner workflow by decoupling the preview steps from the scanner, allowing the technician to work without waiting for the scanner to finish, and allowing the scanner to keep working while slides are previewed. In addition, use of a Preview Imager at the slide preparation bench allows the technician to quickly find and replace slides with obvious defects.

As one example, consider a situation in which 200 slides containing specimens are to be scanned. In this case, assume ten slides are contained in each slide tray. One possible operating sequence for the scanning system, which includes the Preview Station and the Scanner, is as follows:

1. Load slide trays into the Preview Station one at a time and acquire preview images. Note that during this time, the scanner (or scanners) may be in operation scanning a different set of slide trays.

2. Set up operating parameters for the scanner for each of the 100 slides by recalling the preview images acquired in step 1. This operation can be performed after all of the preview images have been acquired, and at a later time if that is more convenient, or even after each preview image is acquired. During this time, the scanner (or scanners) can be actively scanning a different set of slides. Also note that Step 1 and Step 2 may be decoupled from each other in both time and position, since the images from the Preview Station can be transferred to a separate viewing station and the preview images can be reviewed and scan parameters can be set there.

3. Finally, load the slide trays into the autoloader of one or more scanners (or into a scanner, if there is no autoloader). The scanner(s) can now run unattended to acquire high-resolution images of the specimens on the microscope slides.

Figure 10:
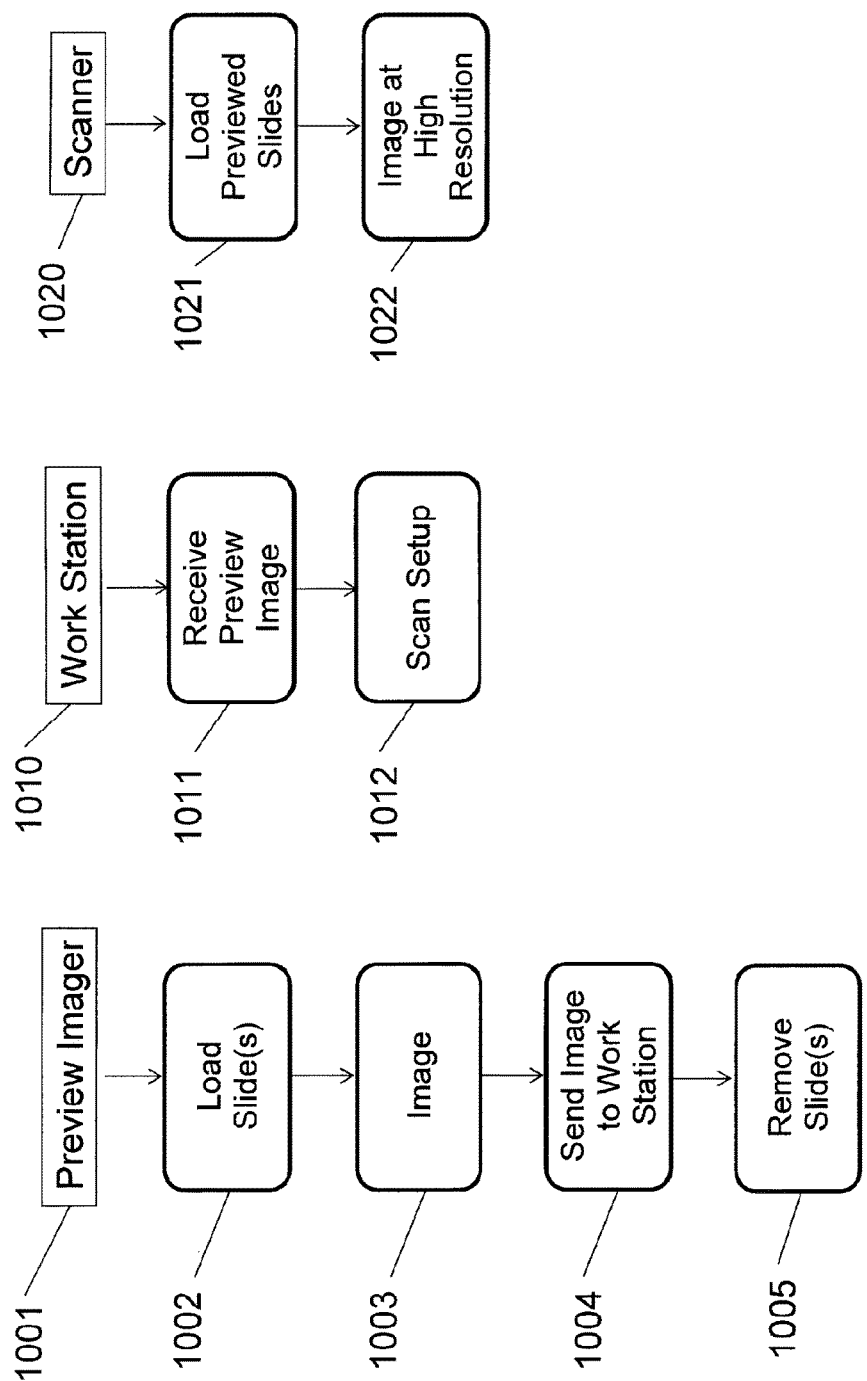
FIG. 10 shows a schematic representation of one proposed workflow using instrumentation consisting of a preview imager, workstation, and scanner.

A first embodiment of a workflow for slide scanning using the Preview Station is shown in FIG. 10. In this workflow, the Preview Imager is used to image the sample(s) but scan setup information is generated from that image in a separate workstation, which sends the scan setup information on to the Scanner. This workflow decouples preview image generation (including imaging the barcode/label), decouples scan-setup, and decouples high resolution image acquisition, all from one another. The sample/sample holder is loaded 1002 into preview imager 1001 manually or automatically. After being loaded, an image 1003 of the samples is acquired and transmitted 1004 to a workstation 1010. The sample holder is then removed 1005 from the Preview Imager and can be loaded into the scanner 1020 or the scanner's autoloader. At the workstation, the received preview images 1011 are used to automatically or manually generate scan setup information 1012 to control the high-resolution scanner. Automatically generated scan-setup information can be reviewed and adjusted if necessary.

While the workstation is in use for generating high-resolution scan-setup information, the Preview Imager can be continuously transmitting additional images to the workstation. The workstation, which also controls the scanner, uses the scan-setup information to acquire the specified high-resolution image. While the scanner is acquiring high-resolution images, the workstation can be receiving additional preview images from the Preview Imager, and also be used to automatically or manually generate additional scan-setups. This arrangement parallelizes the processes of capturing preview images, generating scan-setups, and acquiring high-resolution images. This workflow does not impose physical attachment dependencies on the preview imager, for example, it can be an independent station or attached to the scanner.

The preview imager may also be used to generate scan-setup information and while recognizing this would couple the generation of preview images with generation of scan-setups, it may be desirable under specific lab circumstances. In this case, the Preview Imager must have a screen for displaying preview images and the ability to generate scan-setup information, automatically or manually.

Figure 11:
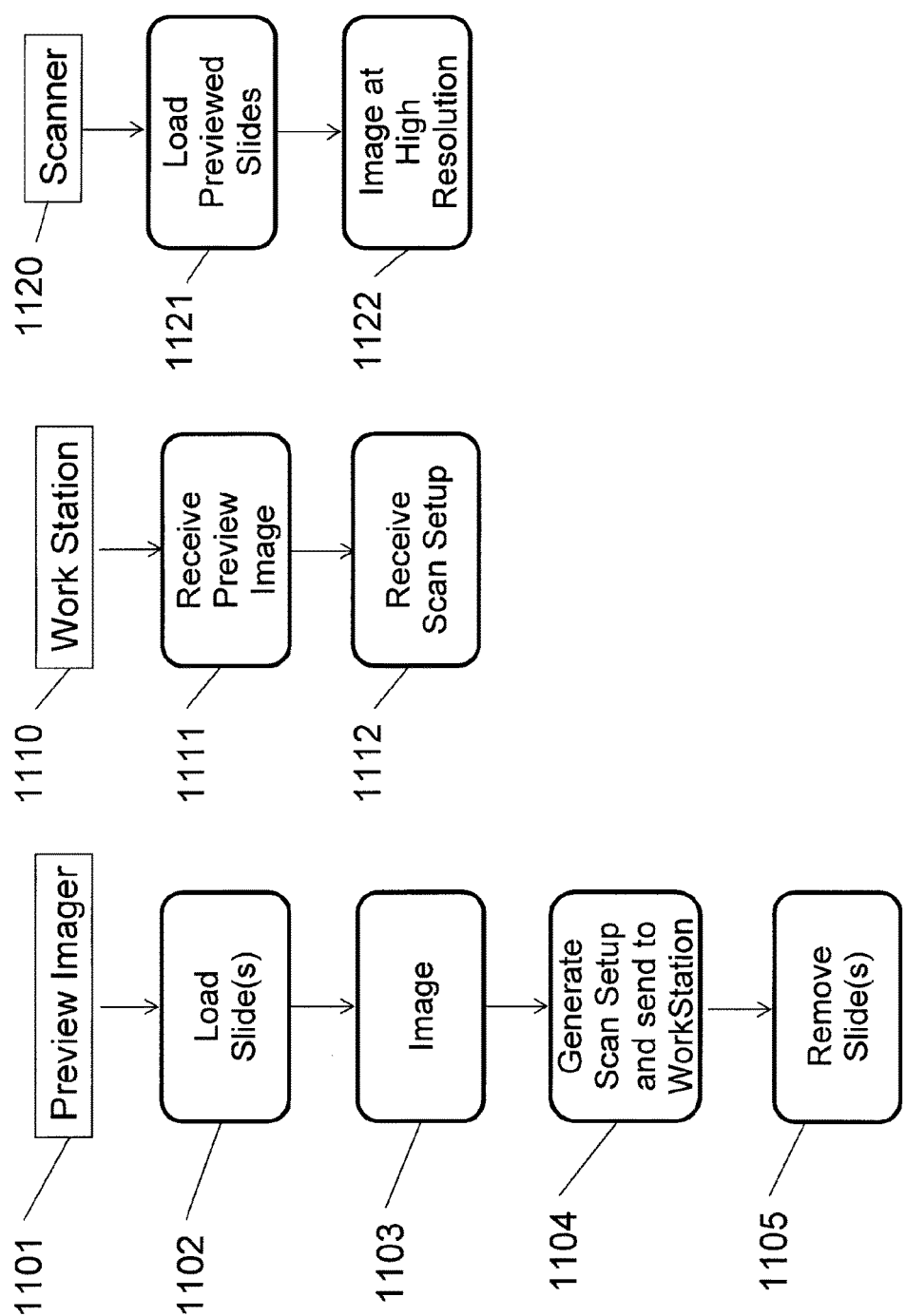
FIG. 11 shows a schematic representation of a second proposed workflow to decouple some of the major steps in the prior-art workflow.

A second embodiment of a workflow is shown in FIG. 11. This workflow couples preview image generation (including barcode/label) with the generation of scan-setup information, and decouples high resolution image scanning. In this embodiment setting up a scan takes place immediately after capturing a preview image. In FIG. 11, the slide(s)/slide tray is loaded 1102 into the preview imager 1101 manually or automatically. After being loaded, an image of the slides is acquired and immediately displayed 1103. The preview images are used to automatically or manually create scan-setups 1104. Automatically generated scan-setups can be reviewed and adjusted if necessary. Then the preview image and scan-setups are transmitted to the workstation 1110. The slide tray is then removed from the Preview Imager and can be loaded into the scanner/autoloader 1121. The workstation, which also controls the scanner 1120, uses the scan-setup information to direct the scanner acquire the specified high-resolution image. While the scanner is acquiring high-resolution images, the workstation can be receiving additional preview images and corresponding scan-setup information from the Preview Imager. This arrangement couples the process of capturing preview images and generating scan-setups however, de-couples the acquisition of high-resolution images. This second workflow does not impose physical attachment dependencies on the preview imager, for example, it can be an independent station or attached to the scanner.

Figure 12:
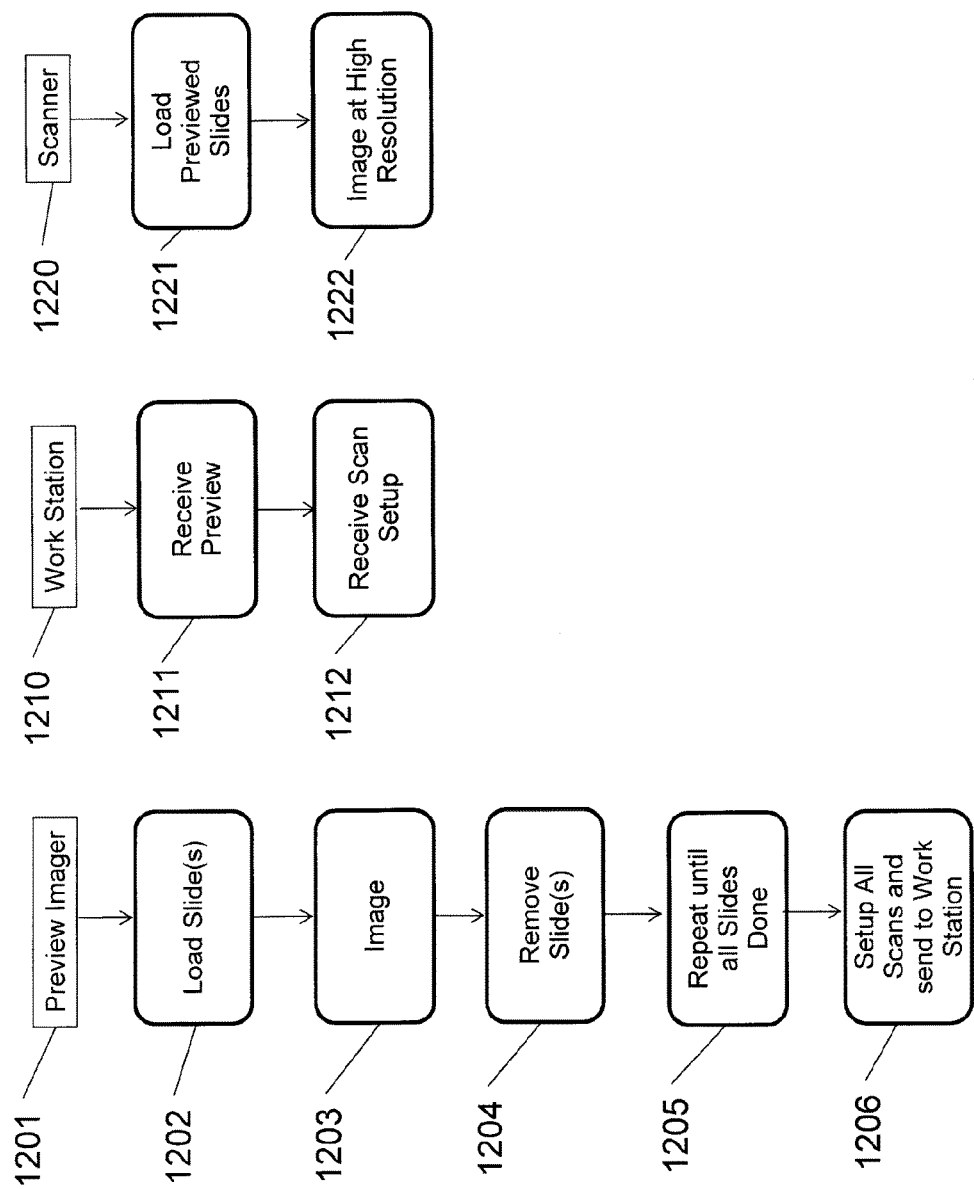
FIG. 12 shows a schematic representation of a third proposed workflow to decouple some of the major steps in the prior-art workflow.

A third embodiment of a workflow is shown in FIG. 12. In this embodiment, all preview images are taken first, followed by setting up all scans. In FIG. 12, the slide(s)/slide tray is loaded into the preview imager manually or automatically. After being loaded, a preview image is acquired and stored. The slide tray is then removed from the Preview Imager and can be loaded into the scanner/autoloader. This process is repeated until all slides/slide trays are loaded and imaged. Upon completion of preview imaging, the preview images are used to automatically or manually create high-resolution scan-setups. Automatically generated scan-setups can be reviewed and adjusted if necessary. After a scan-setup is created, its corresponding preview image and the scan-setup are transmitted to the workstation. The workstation, which also controls the scanner, uses the information in the scan-setups to acquire the specified high resolution image. While the scanner is acquiring high-resolution images, the workstation can be receiving additional preview images and corresponding scan-setups from the Preview Imager. This arrangement couples the process of capturing preview images and generating scan-setups however, de-couples the acquisition of high-resolution images. The workflows described in this disclosure do not impose physical attachment dependencies on the preview imager, for example, it can be an independent station or attached to the scanner.

The Preview Station and Methods of Operation described in this patent document are useful for any imaging system in which a preview image of the specimen is required to set imaging or scan parameters before acquiring a high-resolution image using a scanner or other high-resolution large-area imager. In addition to digital pathology and other microscopy applications in which high-resolution images of the entire specimen are required (often called whole-slide imaging), the present invention will have application when imaging microwell plates, well plates, microarrays, and many others.

Many different arrangements of components are possible in a large hospital or laboratory. For example, several different Preview Imagers can report data to the same Scan Setup Workstation and Database, and the Scan Setup Workstation and Database can control multiple scanners, each of which has its own autoloader, where each of these scanners (and autoloaders) is connected to a network, which may be wired or wireless. The workstation receives preview images and can generate scan-setups and prioritizes scan-setups based on user specifications including predetermined configurable protocols, for example, FIFO (first-in-first-out). The autoloader is able to communicate with the workstation to determine which scan-setup is next in order and load the appropriate sample/sample holder into an available scanner. Scanners communicate with the autoloader updating their status indicating availability for scanning, the need for removal of scanned sample(s)/sample holder, whether they are busy scanning, and other relevant information.

The Preview Imager and Methods of Operation described in this disclosure are useful for any imaging system in which a preview image of the specimen is required to set imaging or scan parameters before acquiring a high-resolution image using a scanner or other high-resolution large-area imager. In addition to digital pathology and other microscopy applications in which high-resolution images of the entire specimen are required (often called whole-slide imaging), the present invention will have application when imaging microwell plates, well plates, microarrays, and many others.

While the embodiments described herein are directed to particular implementations of the portable electronic device, it will be understood that modifications and variations to these embodiments are within the scope and sphere of the present application. For example, the size and shape of many of the features of the portable electronic device can differ while still providing the same function. Many other modifications and variations may occur to those skilled in the art. All such modifications and variations are believed to be within the sphere and scope of the present application.

Having described preferred embodiments of a new apparatus and method for previewing slides and setting up a scan before scanning in a Microscope Slide Scanner, constructed in accordance with the present disclosure, it is believed that other modifications, variations, and changes will be suggested to those skilled in the art in view of the teachings set forth herein. It is therefore to be understood that all such variations, modifications, and changes are believed to fall within the scope of the present disclosure as defined by the appended claims.

We claim:

1. A preview station for previewing a slide tray, the preview station comprising a tray holder supporting the slide tray, the slide tray comprising a plurality of microscope slides, each slide having a specimen thereon, a light source to illuminate the slide tray, a digital camera and lens located on an optical axis relative to die slide tray, the digital camera and the slide tray being fixed relative the one another to take a still image, a focus of the lens being fixed to image the slide tray and the microscope slides thereon simultaneously in a single preview image, the camera having a memory to store and transmit data for the single preview image and each slide of the plurality of microscope slides on the slide tray, a computer processor configured to automatically obtain separate data for each microscope slide by automatically choosing a scan area for each microscope slide and to process each microscope slide from the single preview image and to store and transmit data for the single preview image and for each microscope slide to setup a high resolution scan.

2. The preview station as claimed in claim 1 wherein the computer processor is configured to automatically place focus spots on the scan area of each of the microscope slides on the slide tray.

3. The preview station as claimed in claim 1 wherein at least one of the slide tray and each microscope slide has a barcode thereon.

4. The preview station as claimed in claim 3 wherein both the slide tray and each microscope slide have a barcode thereon.

5. The preview station as claimed in claim 1 wherein the computer processor is configured to automatically choose a location for setting a white balance inside the scan area to be scanned for each microscope slide.

6. The preview station as claimed in claim 5 wherein the computer processor has a display to display images of each slide from the single preview image.

7. The preview station as claimed in claim 6 wherein the computer processor is selected from a group of a desktop, laptop, tablet, phablet and a smart phone.

8. The preview station as claimed in claim 1 wherein the light source is above the tray holder.

9. The preview station as claimed in claim 8 wherein the light source is a first light source and there is a second light source located below the tray holder.

10. The preview station as claimed in claim 9 wherein the tray holder is open to allow light from the second light source to pass through the tray holder.

11. The preview station as claimed in claim 1 wherein the data from each slide previewed by the preview station and the single preview image is transmitted to a high resolution scanner.

12. The preview station as claimed in claim 1 wherein there are a plurality of slide trays that each have a plurality of slides thereon, the plurality of slide trays being mounted on the tray holder in succession, the camera being activated to take a single preview image of each slide tray and the microscope slides thereof.

13. A method of previewing a slide tray using a preview station, the preview station comprising a tray holder supporting the slide tray having a plurality of microscope slides thereon, the microscope slides each having a specimen thereon, a digital camera having a memory and a lens with a light source to illuminate the slide tray, the method comprising locating the camera and lens on an optical axis, fixing the digital camera and the slide tray relative to one another to take a still image and fixing a focus of the lens and activating the camera to image the slide tray and the microscope slides thereon simultaneously in a single preview image, using a computer processor to automatically obtain separate data for each microscope slide by automatically choosing a scan area for each microscope slide and to process each microscope slide from the single preview image, storing the data for the slide tray and the microscope slides thereon and transmitting the data for the slide tray and the microscope slides thereon to setup a high-resolution scan.

14. The method as claimed in claim 13 comprising configuring the computer processor to automatically perform at least one of placing focus spots on the scan area of each microscope slide and choosing a location for measuring white balance.

15. The method as claimed in claim 13 including the step of locating the light source above the tray holder.

16. The method as claimed in claim 13 including the step of locating the light source below the tray holder.

17. The method as claimed in claim 13 wherein the light source is a first light source and there is a second light source to illuminate the slide tray, the method comprising the steps of locating the first light source above the tray holder and locating the second light source below the tray holder.

18. The method as claimed in claim 13 where there are a plurality of slide trays and each slide tray has a plurality of microscope slides thereon, each microscope slide having a specimen thereon, the method comprising locating a first slide tray of the plurality of slide trays on the tray holder and activating the camera to image the first slide tray and the plurality of microscope slides on the first slide tray simultaneously in a first single preview image, removing the first slide tray from the tray holder and placing a second slide tray on the tray holder and activating the camera to image the second slide tray and the plurality of microscope slides as the second slide tray simultaneously in a second single preview image, repeating the method until any additional slide trays and a plurality of microscope slides thereon to be imaged have been imaged simultaneously in an additional a single preview image, for each additional slide tray storing the data from each slide tray and the plurality of microscope slides thereon and transmitting the data for further review or analysis.

19. A preview station and scanning system in combination for previewing and scanning a slide tray having a plurality of microscope slides thereon,
   a. the preview station comprising a tray holder supporting a slide tray having a plurality of slides thereon, each slide having a specimen thereon, a digital camera and lens located on an optical axis to the slide tray, the digital camera and the slide tray being fixed relative to one another to take a still image, a focus of the lens being fixed to image the slide tray and the plurality of slides on the slide tray in a single preview image, a light source to illuminate the slide tray, the camera being activated to image the slide tray and the plurality of slides in a single preview image, the camera having a memory to store and transmit data from the slide tray and the plurality of slides to the scanning system, a computer processor configured to automatically obtain separate data for each microscope slide by automatically choosing a scan area for each microscope slide and to process each microscope slide from the single preview image and to store and transmit data for the single preview image and for each microscope slide to setup a high resolution scan;
   b. data obtained by the preview station comprising specimen information and scanned protocol information;
   c. the data received from the preview station by the scanning system comprising information describing areas to be scanned on each specimen, focus positions for automatic focusing of the scanning system, specimen information for choosing illumination and detection parameters for brightfield or fluorescence imaging, and scan priority for each slide, the scanning system being operable independently and simultaneously with the preview station.

20. A method of scanning specimens on microscope slides, the method comprising previewing information on a plurality of slides on a first slide tray, each slide having a specimen thereon, using a preview station to take a still image of all of the slides and the first slide tray in a first single preview image, the preview station having a digital camera and lens located on an optical axis of the first slide tray, fixing the digital camera and the first slide tray relative to one another, a computer processor configured to automatically obtain separate data for each microscope slide by automatically choosing a scan area for each microscope slide and to process each microscope slide from the first single preview image and to store and transmit data for the first single preview image and for each microscope slide to a scanning system to setup a high resolution scan, the scanning system comprising a scanner, a scan protocol information providing the scanner with one or more descriptions of areas to be scanned on each specimen, focus positions for automatic focusing, specimen information for choosing illumination and detection parameters for brightfield or fluorescence imaging, and scan priority for each slide, whereby the scanner is in continuous operation during operation of the preview station and scanning of previously loaded slides can continue in the scanning system without interruption while using the preview station to preview a second slide tray and imaging a plurality of slides on the second slide tray and the second slide tray in a second single preview image and repeating the method for a further slide tray and a further plurality of slides on the further slide tray.

\* \* \* \* \*